United States Patent [19]

Boots

[11] Patent Number: 4,738,483
[45] Date of Patent: Apr. 19, 1988

[54] AIR GUIDING MECHANISM FOR AN OPEN ROOF CONSTRUCTION, AND AN OPEN ROOF CONSTRUCTION PROVIDED WITH THIS AIR GUIDING MECHANISM

[75] Inventor: Robert T. Boots, Haarlem, Netherlands

[73] Assignee: Vermeulen-Hollandia Octrooien II B.V., Netherlands

[21] Appl. No.: 828,438

[22] Filed: Feb. 10, 1986

[30] Foreign Application Priority Data

Mar. 5, 1985 [NL] Netherlands ............... 8500619

[51] Int. Cl.$^4$ ............................................. B60J 7/22
[52] U.S. Cl. .................................... 296/217; 16/63; 16/82
[58] Field of Search ............... 296/216, 217; 16/63, 16/82, 85, 374, 375

[56] References Cited

U.S. PATENT DOCUMENTS

| | | | |
|---|---|---|---|
| 1,850,229 | 3/1932 | Eastman | 16/82 |
| 3,711,150 | 1/1973 | Perks | 296/217 |
| 3,843,195 | 10/1974 | Lidington | 296/217 |
| 3,984,143 | 10/1976 | Vermuelen | 296/217 |

FOREIGN PATENT DOCUMENTS

| | | | |
|---|---|---|---|
| 2937118 | 4/1981 | Fed. Rep. of Germany | 296/217 |
| 7410150 | 2/1976 | Netherlands | 296/217 |
| 527310 | 7/1977 | U.S.S.R. | 296/216 |

Primary Examiner—Dennis H. Pedder
Attorney, Agent, or Firm—Kinney & Lange

[57] ABSTRACT

The invention relates to an air guiding mechanism for an open roof construction with a sliding panel, for a vehicle. The mechanism comprises an air guiding strip which can be fitted at the front edge of the roof opening. The air guiding strip is displaced upwardly into an operative position by a spring when the panel is being opened and is brought to a rest position against the pressure of the spring means under the action of this panel when the panel is being closed. A stop determining the operative position of the air guiding strip is provided on a blocking member which is connected to the air guiding strip. Preferably the stop is adjustable, so that the operative position of the air guiding strip can very easily be adjusted to different vehicle roofs.

5 Claims, 2 Drawing Sheets

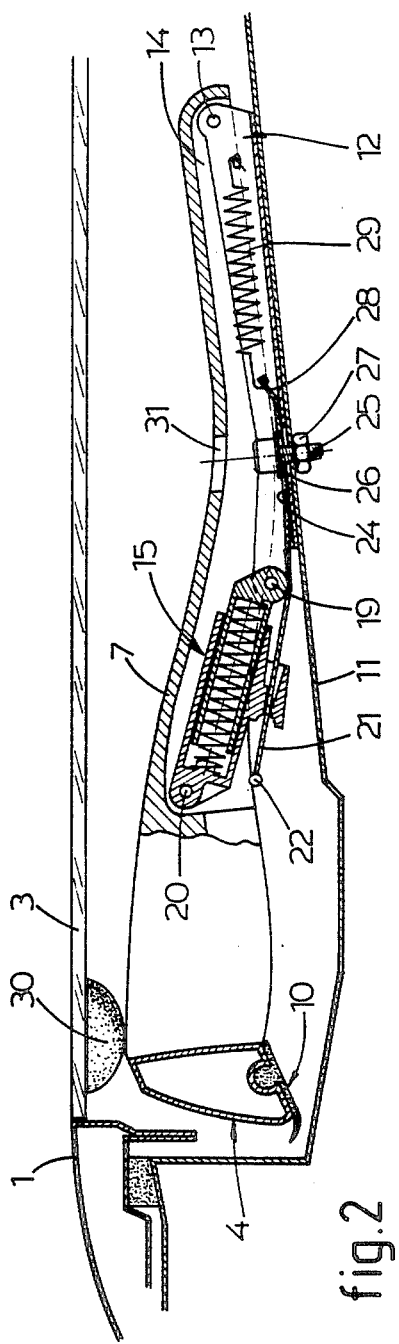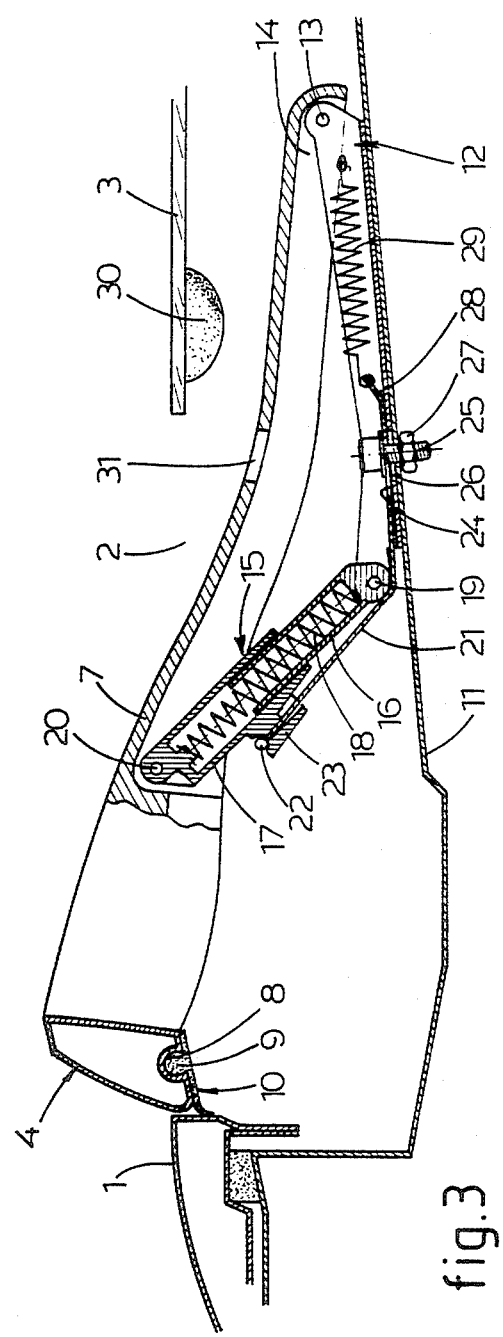

AIR GUIDING MECHANISM FOR AN OPEN ROOF CONSTRUCTION, AND AN OPEN ROOF CONSTRUCTION PROVIDED WITH THIS AIR GUIDING MECHANISM

The invention relates to an air guiding mechanism for an open roof construction on a vehicle having a roof opening and a sliding panel that can be moved to open or close the opening. The mechanism comprises an air guiding strip, which can be fitted at the front edge of the roof opening.

In a known embodiment of such an air guiding mechanism the air guiding strip engages a horizontal edge portion of the fixed roof at the front side of the roof opening when the air guiding strip is being displaced upwardly, the edge portion thereby forming a stop for the air guiding strip and determining the operative position thereof.

However, after installation of the open roof construction in the vehicle roof such edge portion is now always available, in which case there is no stop for the air guiding strip.

It is an object of the present invention to provide an open roof construction, in which the above problem is effectively solved.

To this end the air guiding mechanism according to the invention comprises an air guiding strip, which can be fitted at a front edge of a roof opening and spring means, which can displace the air guiding strip upwardly into an operative position when the sliding panel that is used to close the roof opening is being opened. The air guiding strip is brought back to a rest position against the pressure of the spring means under action of this panel when the panel is being closed. A stop determines the operative position of the air guiding strip, and a blocking member is connected to the air guiding strip and provided with a stop.

In this way the air guiding mechanism itself has a stop, which is independent of the vehicle roof.

Preferably the stop is adjustable. Thereby, the operative position of the air guiding strip can very easily be adjusted to different vehicle roofs.

Further the invention relates to an open roof construction provided with the air guiding mechanism described hereinbefore.

The invention will hereafter be elucidated with reference to the drawings which show an embodiment of an air guiding mechanism according to the invention by way of example.

FIG. 2 is an enlarged section along the line II—II in FIG. 1, partially broken away, with the panel is in its closed position.

FIG. 3 is a section corresponding to FIG. 2, wherein the panel is in a partially opened position.

Figure 1:
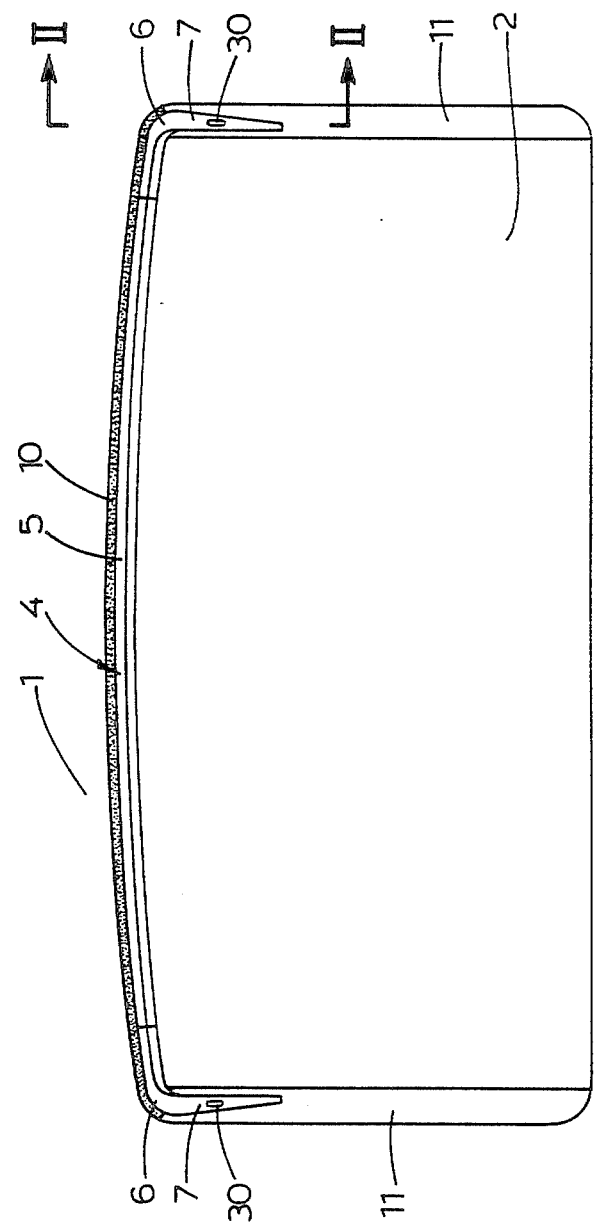
FIG. 1 is a schematic plan view of the opening in a vehicle roof in the fully opened position of the sliding panel, wherein the air guiding mechanism according to the invention can be seen.

The drawing illustrates an open roof construction for a vehicle, specifically an automobile, which is provided with an air guiding mechanism.

The fixed roof 1 of the vehicle comprises an opening 2, which can be closed by means of a sliding panel 3. An air guiding strip 4 is fitted on the front side of the roof opening 2. This air guiding strip 4 comprises a central strip portion 5, which has a bend 6 section at each end that connects to rearward bearing arms 7.

The central strip portion 5 as well as the bend sections 6 and rearward bearing arms 7 are of a substantially rigid construction and have a groove 8 in their lower surface, in which a support rib 9 of an elastic sealing section 10 is accommodated.

The bearing arms 7 are pivotally connected at their rear ends to a gutter construction 11 of the open roof construction on both sides of the roof opening 2. To this end on each gutter construction 11 an U-shaped bearing support section 12 is provided. A pivot shaft 13 passes through the rear portion of bearing support section 12 and the rear end of the respective bearing arm 7, so that the respective bearing arm 7 and thereby the whole air guiding strip 4 can pivot about this pivot shaft 13. Each bearing arm 7 is provided with a recess 14 at its lower side, which recess 14 partially accommodates the bearing section 12 and also receives a compression spring means 15 in the downwardly pivoted position of the air guiding strip 4.

This compression spring means 15 comprises a compression spring 18, mounted in telescoping tubes 16, 17. The lower or inner tube 16 is pivotally connected to the front portion of the bearing section 12 by means of a transverse shaft 19. The upper or outer tube 17 pivotally engages the bearing arm 7 near the front side thereof by means of a transverse shaft 20 provided in the respective bearing arm 7.

The bearing section 12 is not only connected to the respective bearing arm 7 of the air guiding strip 4 through the pivot shaft 13 and the telescoping tubes 16, 17 but also by means of an adjustable blocking strip 21 that slides in a sleeve 23 mounted on the tube 7. At the side of the sleeve adjacent the air guiding strip 4 this blocking strip 21 is provided with a stop 22, which can be locked or stopped in the direction of the blocking strip 21 by seating on the end of sleeve 23, which forms a counter stop on the tube 17. This sleeve 23 further forms a guide, which guides an end portion of the blocking strip 21 having the stop 22 thereon in such a way that the upper tube 17 is only movable in the longitudinal direction of this end portion of the blocking strip 21.

At the side of the bearing section 12 the blocking strip 21 has a slot 24 extending in the longitudinal direction of the vehicle, which slot 24 receives a screw 25 which further passes through a slot 26 in the bearing section 12 and through a hole in the gutter construction 11. The screw 25 clamps the blocking strip 21 onto the bearing section 12 and the bearing section 12 onto the gutter construction 11 by means of a nut 27 disposed underneath the gutter construction 11.

The slot 24 in the blocking strip 21 serves for adjusting the length of the end portion of blocking strip 21 carrying the stop 22 formed on the blocking strip 21 and consequently adjusting the height of the air guiding strip 4 before it is stopped. The slot 26 in the bearing section 12 enables the air guiding strip 4 to be adjusted in the longitudinal direction of the gutter construction 11.

A tension spring 29 engages the rear end 28 of the blocking strip 21, which lies at the side of the slot 24 and which is bent to an upwardly and backwardly inclined direction. The other end of tension spring 29 is connected to the bearing section 12 and exerts a rearwardly directed tension force onto the blocking strip 21. The purpose of this draw spring 29 will be elucidated hereinafter.

The blocking strip 21 is flexible and is guided between its ends around the lower end of the lower tube 16.

FIG. 2 illustrates the panel 3 in its closed position, wherein a cam 30 provided on both sides of the roof opening underneath the panel 3 has engaged the respective bearing arm 7 of the air guiding strip 4 and has brought the strip 4 into an downwardly pivoted position against the spring compression of the compression spring 18.

In FIG. 3 the panel 3 has been slide backwardly, while the engagement of the cams 30 underneath the panel 3 and the bearing arms 7 of the air guiding strip 4 has been released and the compression springs 18 have pivoted the air guiding strip 4 into a highest or operative position, which is determined by the stop 22 of the blocking strip 21.

The adjustment of the highest or operative position of the air guiding strip 4 can be carried out as follows:

In an opened position of the panel 3, as shown in FIG. 3 the screws 25, which can be reached through a hole 31 in the respective bearing arm 7 are turned loose. The compression springs 18 in the telescoping tubes 16, 17 push the front side of the air guiding strip 4 upwardly, whereby the bearing arms 7 pivot about the pivot shafts 13 until the rear ends of the slots 24, which move forwardly as a consequence of the pivoting movement of the blocking strips 21, come into engagement with the respective screws 25.

In this position the air guiding strip 4 has reached its extreme outwardly pivoted position. During this pivoting movement the force of the compression springs 18 should exceed the action of the tension springs 29, so that the stops 22 of the blocking strips 21 are carried along by the sleeves 23.

When the air guiding strip 4 is hereafter moved downwardly, for instance by hand until the operative position thereof has been reached, each tension spring 29 will keep the respective blocking strip 21 with its stop 22 in contact with the stop end of the sleeve 23 of the upper tube 17, so that the slot 24 in the blocking strip 21 moves backwardly with respect to the screw 25.

When the air guding strip 4 is in the desired operative position the screws 25 are then tightened, so that the blocking strips 21 are clamped with respect to the respective bearing sections 12 and the upward pivoting movement of the air guiding strip 4 is limited to this operative position.

In the working position the elastic sealing section 10 seals against the vertical wall at the front side of the roof opening 2.

The invention is not restricted to the embodiment shown in the drawing by way of example, which can be varied in different ways within the scope of the invention.

I claim:

1. An air guiding mechanism for an open roof construction with a sliding panel that moves between an open and a closed position and used on a vehicle provided with a roof opening having a front edge, the mechanism comprising;
    a stationary part having means for securing it to the roof of a vehicle;
    an air guiding strip, adapted to fit at the front edge of the roof opening, the air guiding strip being movable between a lower rest position and an upper operative position;
    spring means between the stationary member and the air guiding strip for resiliently displacing the air guiding strip upwardly into its operative position when the panel is being opened, and means connected to the panel and the air guiding strip for moving the air guiding strip to the rest position against the resilient urging of the spring means, when the panel is being closed;
    connection means connecting the air guiding strip to the stationary part of the air guiding mechanism and allowing movement of the air guiding strip between its respective rest and operative positions;
    an adjustable blocking strip interconnecting the air guiding strip and the stationary part, the blocking strip having a longitudinal length between first and second ends and means for adjustably mounting the first end of the adjustable blocking strip to the stationary part, the means for adjustably mounting comprising a slot formed in the first end of the adjustable blocking strip and extending in a longitudinal direction of the blocking strip and a fastening means engaging the longitudinal slot in the first end of said blocking strip;
    stop means on the second end of the blocking strip for determining the operative position of the air guiding strip, the air guiding strip having counter stop means cooperating with the stop means for determining such operative position; and
    a spring engaging the first end of the blocking strip, the spring being mounted for exerting a force on the blocking strip urging the blocking strip longitudinally in a direction away from the stop means, wherein the spring automatically urges the blocking strip and consequently the stop means against the counterstop means when the fastening means is loosened and the air guiding strip is held in the operative position during the installation of the open roof construction on the vehicle.

2. An air guiding mechanism as claimed in claim 1, wherein the means for securing the stationary part includes means for adjusting the stationary part in a longitudinal direction of the vehicle.

3. An air guiding mechanism as claimed in claim 2, wherein the means for adjusting the stationary part comprises a slot extending in a longitudinal direction of the vehicle, said slot being adapted to receive the fastening means.

4. An air guiding mechanism as claimed in claim 3, wherein the fastening means for the blocking strip also serves as fastening means for the slot of the stationary part.

5. An air guiding mechanism for an open roof construction with a sliding panel, for use on a vehicle provided with a roof opening having a front edge, the mechanism comprising:
    a stationary part adapted to be mounted on a vehicle roof;
    an air guiding strip, which is of a size to be fitted at the front edge of the roof opening;
    a separate rigid bearing arm means connected to the opposite sides of the air guiding strip and extending in a rearward direction therefrom and being pivotally mounted on the stationary part, the panel engaging the bearing arm means when the panel is being closed, the air guiding strip being movable between an operative position and a rest position;
    spring means for displacing the air guiding strip upwardly into its operative position when the panel is being opened, separate spring means being provided underneath each bearing arm means and each first mentioned spring means comprising a telescoping tube assembly having upper and lower parts and a compression spring within the tube assembly tending to separate the upper and lower parts, the lower part of each tube assembly having a lower end pivotally connected to the stationary part and the upper part of each tube assembly being pivotally connected to the respective bearing arm means, the upper part of each tube assembly having a guiding sleeve formed thereon;

an adjustable blocking strip associated with each tube assembly and the stationary part, each blocking strip having first and second ends, the first end being adapted to be adjustably mounted on the stationary part;

stop means for determining the operative position of the air guiding strip, the stop means being provided on each blocking strip at the second end thereof; and each of the blocking strips being guided between its first and second ends around the lower end of the lower part of the respective tube assembly, and the end portion of the blocking strip near the stop means being slidably mounted in the guiding sleeve at the upper part of the respective tube assembly, the guiding sleeve further serving as a counter stop means for the stop means on the associated blocking strip.

* * * * *